June 8, 1926.
W. S. HARLEY
POWER IMPULSE EQUALIZER
Filed Dec. 13, 1920
1,587,724
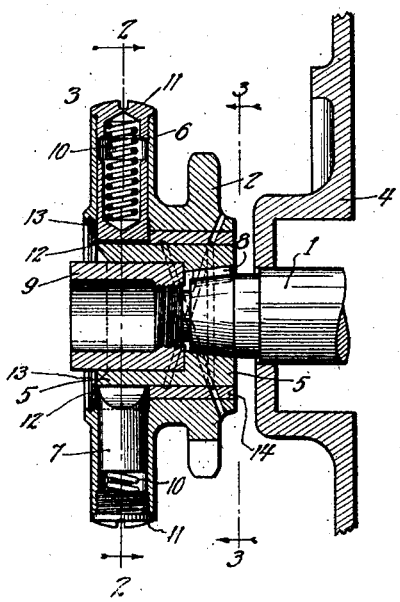
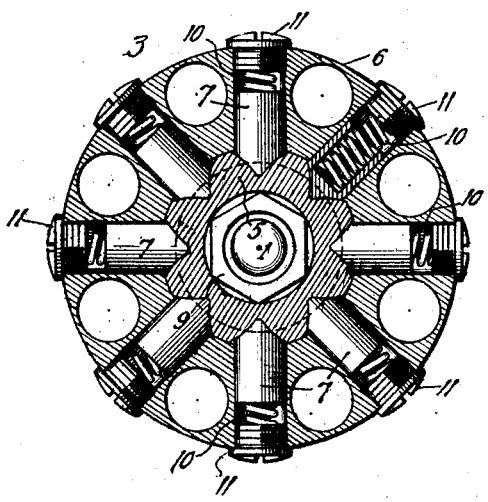
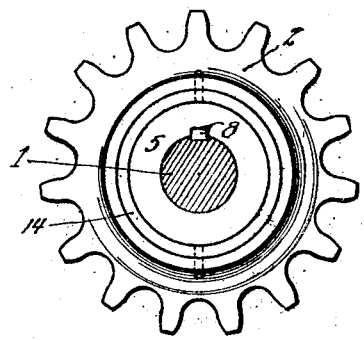
Inventor
William S. Harley.
By Edwin B. H. Tower Jr.
Atty.

Patented June 8, 1926.

1,587,724

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

POWER-IMPULSE EQUALIZER.

Application filed December 13, 1920. Serial No. 430,257.

This invention relates to a power impulse equalizer.

The equalizer is particularly applicable to transmission systems of motorcycles, although it may be used for various other transmission systems.

The power developed by a high compression engine during a given cycle varies or fluctuates. The extent of the fluctuations varies in inverse ratio to the number of cylinders used. Consequently, in a twin-cylinder engine, the power variations are inherently large, especially when the cylinders are arranged on a V.

Therefore, it is desirable that means be provided whereby the peaks of power impulses developed by such an engine are not transmitted to the driven member.

An object of this invention is to provide an equalizer which will absorb the power variations transmitted to it by a prime mover.

Another object is to provide an equalizer which will absorb the peak of the power impulses of a prime mover and will transmit the power impulses of such prime mover equally and smoothly to a transmission system.

Another object is to provide a simple and efficient power impulse equalizer.

Another object is to provide an equalizer wherein the wastage of power between a driving member and a driven member is reduced.

Another object is to provide a power impulse equalizer which tends to dampen out speed fluctuations transmitted to it.

Other objects and advantages will hereinafter appear.

The views of the drawings are:—

Figure 1 is a vertical section through the power impulse equalizer interposed between an engine shaft and a sprocket to be driven thereby.

Figure 2 is a transverse section on line 2—2 of Figure 1.

Figure 3 is a transverse section on line 3—3 of Figure 1.

Interposed between a driving member 1 and a driven member 2 is a power impulse equalizer 3.

The driving member 1 may comprise an engine shaft mounted in suitable bearings and extending through a crank case 4.

The driven member 2 is shown in the form of a sprocket wheel although it may assume other forms, as for example, a gear.

The power impulse equalizer 3 comprises a cam carrying sleeve 5 rigidly fastened to the driving member 1 and a circular flange or housing 6 in the form of a flywheel rigidly fastened to the driven member 2, and carrying a plurality of resiliently mounted wedge shaped plungers 7 which cooperate with the cam faces carried by the sleeve 5.

The sleeve 5 may be rigidly fastened to the driving member 1 by means of a key 8 and a nut 9.

The circular flange 6 has a plurality of radially drilled holes within each of which is one of the plungers 7, recessed at one end to receive a compression spring 10, and wedge-shaped at the other end to cooperate with the cam faces in the sleeve 5. The springs 10 are held in the plunger 7 under compression by threaded caps 11 screwed into the periphery of the flange 6.

The circular flange 6 may be rigidly fastened to the driven member 2 in any suitable manner or may form a part thereof as shown in Figure 1.

Thus it will be seen that the power applied to the driving shaft 1 is transmitted to the driven member 2 through the cams carried by the sleeve 5 and the plungers 7 carried by the flange 6.

At low speeds particularly, and immediately at the time of combustion within the cylinders, the driving shaft and sleeve 5 rigidly fastened thereto, tend to accelerate in a forward direction. This action induces the spring pressed plungers 7 to tend to climb up the sides of the cam faces and compress the springs 10 and thus prevent the application of a severe shock to the rest of the mechanism. As the maximum pressure point is passed, the springs 10 will force the plungers downward again to their original positions, and thus give back the power previously stored therein. In this way, the power impulse equalizer is very efficient, differing therein from various forms of clutches in which power is wasted when any slipping occurs.

A washer 12 encircling the nut 9 and spaced therefrom, bears tangentially against the peripheries of the several plungers 7 and also against the outer end of the sleeve 5. Outside the washer 12 and contacting therewith, is an expanded spring washer 13 which fits into an inner peripheral groove in the flange 6. The purpose of these washers is to prevent slippage of the sprocket wheel towards the crank case 4.

A bushing 14 of phosphor bronze or other suitable material may be inserted between the sprocket wheel 2 and sleeve 5.

The embodiment shown and described is for the purpose of illustration only. The drawings and descriptions are, therefore, to be considered in an illustrative and not in a limiting sense, for it is obvious that many modifications will readily occur to and may be made by those skilled in the art without departing from the spirit and scope of the invention as defined in the appended claims.

The invention claimed is:—

1. A power impulse equalizer for a motorcycle comprising means interposed between the driving and driven members, said means comprising a sleeve secured to the driving member and having a plurality of V-shaped grooves in the periphery thereof, and a fly wheel surrounding said sleeve and having a plurality of recesses extending inwardly from the periphery thereof, spring pressed plungers carried by said recesses and co-operating with said grooves whereby fluctuations in the speed of the driving member are absorbed by said plungers, and subsequently delivered back to said driving member.

2. A power impulse equalizer for an engine comprising an annular fly wheel provided with a radial recesses extending inwardly from the periphery thereof, spring pressed plungers carried by said recesses and a sleeve within said fly wheel attached to the engine shaft carrying cam faces arranged to co-operate with the spring pressed plungers to equalize the power variations.

3. A power impulse equalizer for an engine comprising a cam member driven by the engine shaft, an annular fly wheel surrounding said cam member and provided with radial recesses extending through the face thereof, spring pressed plungers carried by said recesses and adapted to co-operate with the cam member to dampen out irregularities in the speed of the engine.

4. In a power transmission system a driving shaft, a sleeve attached to the driving shaft, a plurality of cams carried by said sleeve, a bushing on said sleeve, a driven member comprising an integral fly wheel and sprocket wheel mounted on said bushing, and spring pressed plungers carried by said fly wheel co-operating with said cams to equalize the power impulses transmitted by the driving shaft.

In witness whereof, I have hereunto subscribed my name.

WILLIAM S. HARLEY.